No. 739,851. PATENTED SEPT. 29, 1903.
J. W. GENTRY & A. H. STROEMER.
CORN PLANTER.
APPLICATION FILED NOV. 19, 1902.
NO MODEL. 2 SHEETS—SHEET 2.
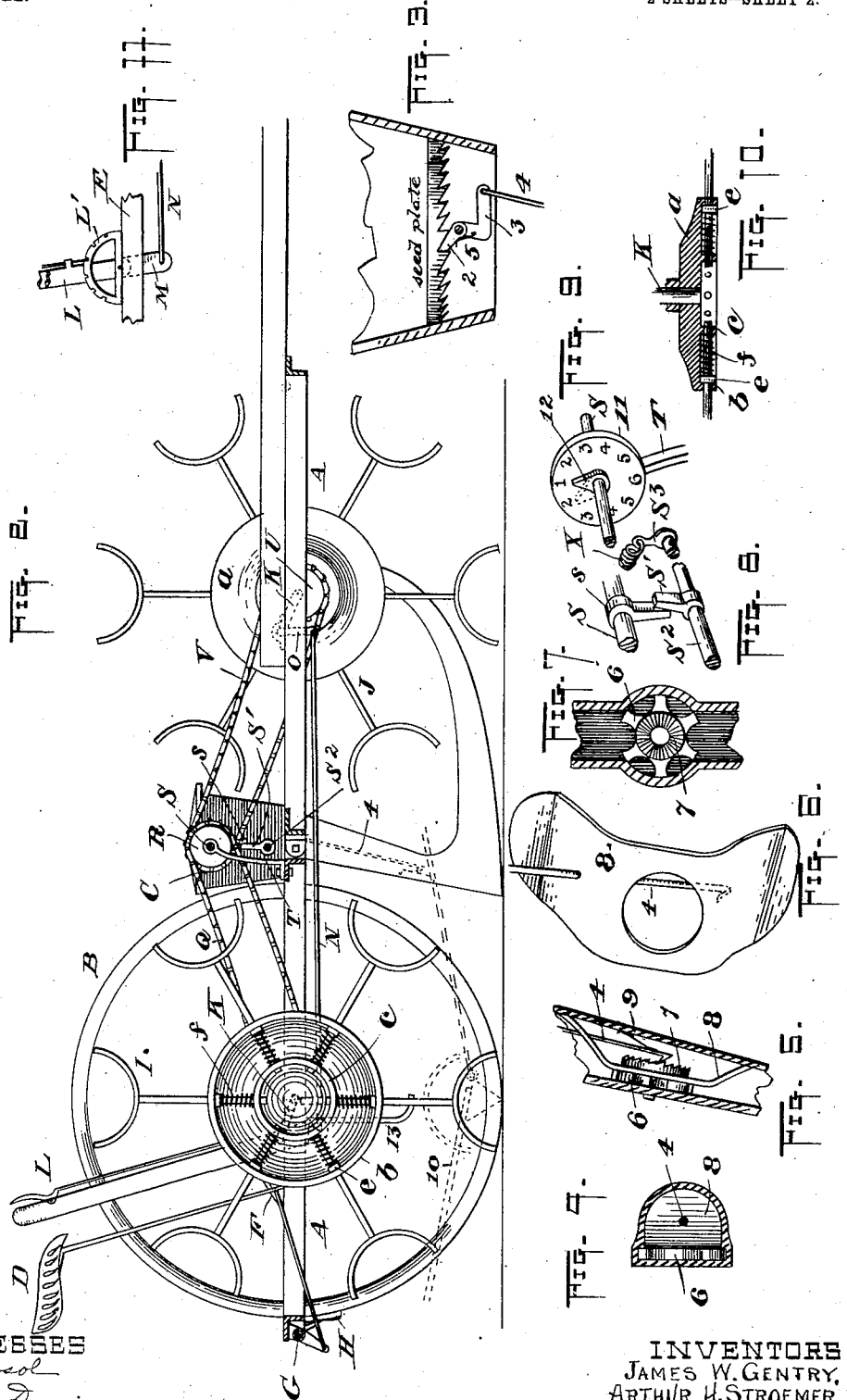
WITNESSES
INVENTORS
JAMES W. GENTRY,
ARTHUR H. STROEMER,
By L. M. Thurlow, Atty.

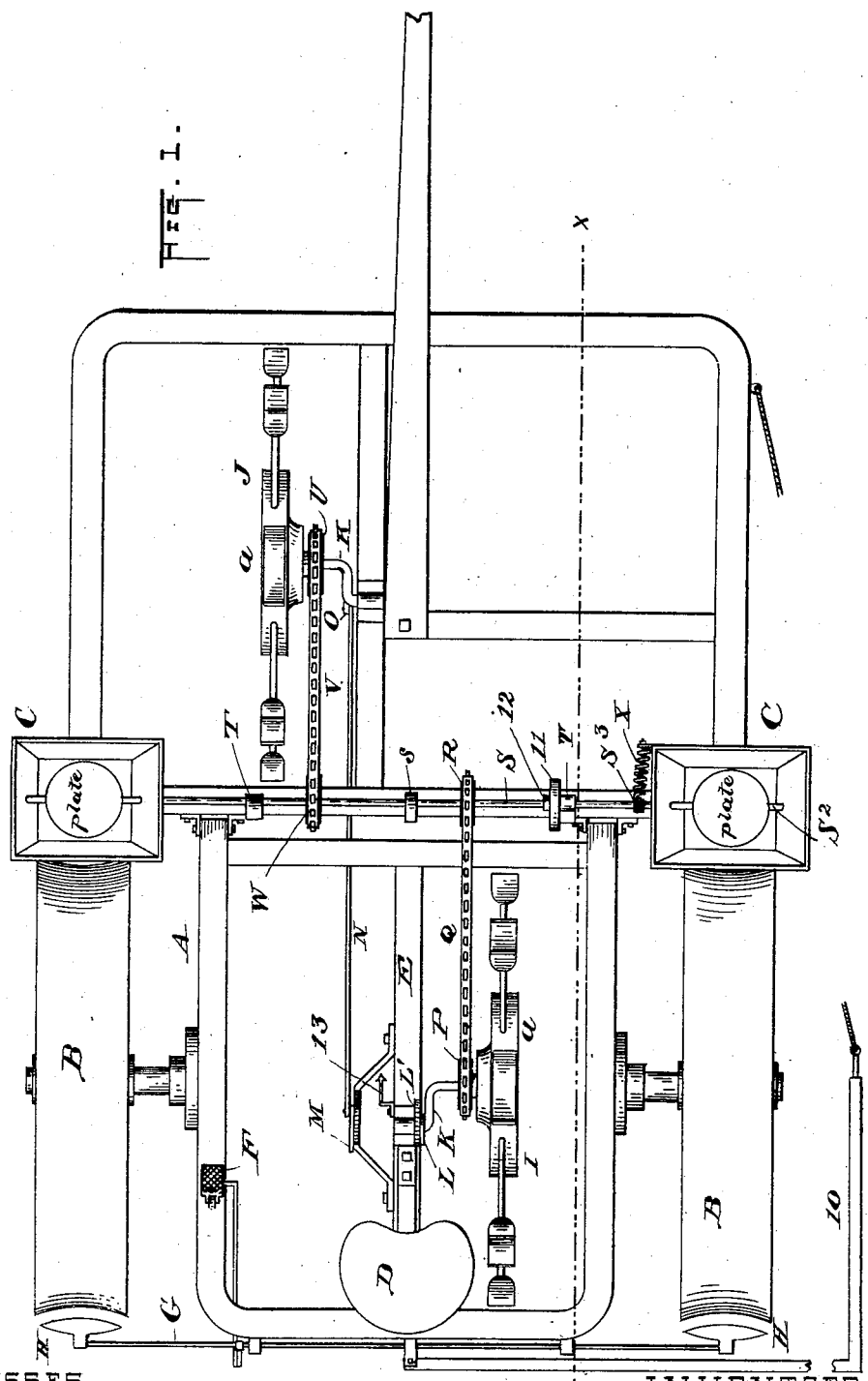

No. 739,851.

Patented September 29, 1903.

UNITED STATES PATENT OFFICE.

JAMES W. GENTRY AND ARTHUR H. STROEMER, OF PEORIA, ILLINOIS.

CORN-PLANTER.

SPECIFICATION forming part of Letters Patent No. 739,851, dated September 29, 1903.

Application filed November 19, 1902. Serial No. 132,035. (No model.)

*To all whom it may concern:*

Be it known that we, JAMES W. GENTRY and ARTHUR H. STROEMER, citizens of the United States, residing at Peoria, in the county of Peoria and State of Illinois, have invented certain new and useful Improvements in Corn-Planters; and we do hereby declare that the following is a full, clear, and exact description of the invention, which will enable others skilled in the art to which it appertains to make and use the same.

This invention relates to improvements in corn-planters of that class whose seeding mechanism is operated from the ground-wheels instead of by means of the check-wire.

The prime object of our invention is to provide a double contact with the ground of the driving mechanism, so that all chance of planting the hills out of line is avoided.

Another object of our invention is to use an improved means of easily setting the dropping mechanism in order to plant the hills of corn in perfect line.

The invention pertains to certain devices that will be described herein and made a part of the claims.

In the accompanying drawings, Figure 1 is a plan view of our corn-planter. Fig. 2 is a longitudinal section on line X X, Fig. 1. Fig. 3 is a sectional elevation of one of the seed-boxes, showing the mechanism for operating the seed-plate. Fig. 4 is a transverse section of the runner-shank, showing a second drop therein. Fig. 5 is a sectional elevation of the same, showing the said second drop. Fig. 6 is a perspective view of a metal partition used in the said shank. Fig. 7 is a sectional elevation of a part of the shank as viewed from the front, showing the second drop. Fig. 8 is a perspective view of portions of two shafts used in dropping the seed. Fig. 9 is a perspective view of a dial and indicator for use in setting the dropping mechanism at the desired point for planting the hills of corn in line. Fig. 10 is a cross-section of a portion of a wheel used for driving the seeding mechanism. Fig. 11 is a side view of the levers used for raising the operating-wheels from the ground.

A indicates the frame or wheel section of the planter, and B the carrying-wheels, while C C are the seedboxes.

D is the usual seat secured on the beam E, and F is a foot-lever which operates the rock-shaft G and scrapers H, all of which are common to machines of this class.

In our improved planter we employ a wheel I, journaled in the rear portion of the planter, and a similar wheel J near the front, as shown. These two wheels consist of radial spokes each having a U-shaped portion for contact with the ground. The said spokes are yieldingly held in a hub of the cross-section shown in Fig. 10. Said hub consists of a casting $a$, having two annular flanges $b$ and $c$ on one of its faces, and through these the spokes extend, as shown. A spring $f$ is placed around each spoke outside of the flange $c$, and a stop $e$ on said spokes serves to take the pressure of the spring, so that when the spoke is forced in a direction to compress the said spring, as in passing over obstructions, such spring readily returns the portions to their normal positions. A rear cranked shaft K is journaled on the frame member E and carries the rear wheel I, as shown, and attached to such shaft is an operating-lever L. A depending arm O is rigidly attached to the arm K of the front wheel J, and to its lower end is attached a rod N, which extends rearward and is connected to the lower end of a lever M, as clearly shown in Fig. 11. A movement of the lever M will raise or lower the wheel J, while a movement of the lever L will operate the wheel I in like manner. A sprocket-wheel P, revolving with the rear wheel I, transmits motion through a sprocket-chain Q to a sprocket-wheel R on a shaft S, journaled in arms T on the beam, which supports the seedboxes C. A sprocket-wheel U on the wheel J drives said shaft S through chain V and wheel W, as shown. This shaft S has no connection with the seeding devices directly, but has a lug $s$, which revolves therewith and engages a similar lug S' on a rock-shaft $S^2$, which extends across the machine and passes into each seedbox. It will be seen that the revolution of the shaft S will cause the lug $s$ to strike the lug S' on the shaft $S^2$ at each turn. As shown in Figs. 1 and 8, we show an arm $S^3$, having a spring X attached thereto at one end, while the other end of such spring is connected with a lug on the seedbox. This spring is for the purpose of returning the shaft to its proper position after each movement imparted to it by the shaft S and lug s. In Fig. 3 we show a sectional elevation of the seedbox, showing the seed-plate therein, beneath which the shaft $S^2$ rocks. Said shaft carries a pawl 2 and an arm 3, to which is connected a depending rod 4. A spring 5 serves to keep the pawl in engagement with the ratchet of the seed-plate, so that each rocking of the shaft $S^2$ will turn the plate a portion of a revolution to deliver seed into the shank of the runner, as in ordinary practice. The said depending rod 4 (shown in Figs. 2, 4, 5, 6) carries at its lower end an upturned point to form a pawl which engages the ratchet-teeth 7 of what is termed a "second drop." (Shown in Figs. 4, 5, and 7.) It consists of a star-shaped body 6, between whose arms the seed rests. Said body is seated in an enlarged portion of the shank, as shown in Fig. 7, and one face thereof carries the ratchet-teeth above mentioned. This device is carried by means of a metal plate 8 in form of a U, in which is a hole, as shown in Fig. 6, through which the ratchet-teeth 7 project, as shown in Fig. 5. The back wall of the shank and the said plate 8 form a tight inclosure for the body, so that seed may fall from the seedbox and enter the recess between the arms and there remain until the body has been turned a half-revolution to drop the seed below. The rod 4 extends through the plate 8 and engages the ratchet-teeth and is kept in engagement therewith by means of a spring 9. Now it will be seen that at each movement of the rock-shaft $S^2$ the rod 4, just mentioned, will be moved in the direction of its length and will give the body 6 a partial turn, so that simultaneous with the moving of the seed-plate to drop the corn into the shank, the said body 6 is turned to catch the seed for planting.

In operation the driver when desiring to plant the corn allows the wheels I and J to contact with the ground by throwing the levers which control them to their forward positions. This at once transmits motion to the shaft S, with the result already described—i. e., dropping the seed through the medium of the rock-shaft $S^2$ and its attachments. Being provided with the usual marker 10, the machine after reaching the end of the field is turned around, as usual, and is made to straddle the mark made by the said marker. At this particular time we wish to direct attention to an indicator provided for the purpose of starting the new row in proper manner. This indicator consists of a dial 11, attached to one of the bearings T, and is shown in Figs. 1 and 9. Said dial is provided with numerals from "1" to "6," reading in both directions, as shown in said Fig. 9. The shaft S passes through this dial and carries an indicator-point 12, which revolves with it. The manner of using this arrangement is as follows: On reaching the end of the row the driver, as usual, raises his marker and also the wheels I and J, and when his machine has been turned around and straddles the mark just completed the guide-point, consisting of the depending rod 13 on the machine-frame, is brought just above the end of such mark. Now if the dial 11 be consulted it will be found that the pointer 12 is opposite one or between two of the figures. As an instance let it be supposed that said pointer rests at the numeral "2" when the wheels I and J and the marker 10 are raised at the end of the row. In entering upon the new row, the guide 13 being placed as above intimated, the wheel I is turned by hand until the pointer 12 is opposite the numeral "2" at the other side of the disk. On lowering the wheels I and J at this time and proceeding with the planting it will be found that the first hill and the succeeding ones will be in perfect line with those of that part of the field already planted. To make this clear, it is necessary to have it understood that when the pointer stands at the numeral "1" and at each time it reaches that figure a hill of corn is dropped. Now on reaching the end of the field the wheels I and J and the marker 10 are raised simultaneously, thereby stopping the planting and terminating the guiding-line at the same moment. At this time the pointer 12 will be somewhere between "1" and "6" on the dial at either side, and if at "2," for example, as before described, in retracing the guiding-line by means of the guide 13 the same distance traveled after the last hill planted must be retraced and then a hill dropped. Since a planting takes place always at "1" and the pointer was standing at "2" at the end of the row, it follows that on turning around upon the new row the pointer must be swung to the other side of the dial to the opposite corresponding numeral. Then when the wheels are dropped into the ground the pointer is carried back to "1" and a hill is planted by reason of the lugs s and S' coming together. If the pointer were not carried to the opposite position described, it is obvious that before the hill was planted the said pointer would have traveled entirely around the dial before said hill was dropped, thus throwing the row entirely out of line. As in other machines of this class, the wheels I and J can be raised for an instant to allow the planting to be brought into line if for any reason the hills do not "line up." By means of the two levers either one or both of the wheels may be elevated, as desired. By providing two wheels and placing one far ahead of the other, so that the same form of ground-surface is not gone over at the same time, we are enabled to make the planting perfect, because one wheel will be a check to the other. For instance, if one of them rises upon a lump or sinks into a hollow, and thus tends to revolve the shaft faster or slower, as the case may be, the other wheel in traversing a different surface will revolve at the proper rate of speed and by reason of having better contact with the ground will have the greatest pull and will rather drag or hasten the opposite wheel through the sprockets and their chains; but the revolution of the shaft S will be constant. To further aid in this operation, the spokes of the wheels are yielding in the direction of their lengths, so that a resisting lump, such as a stump or stone, will not effect a change of speed of the wheel meeting it.

We claim—

1. In a corn-planter having seed-dropping mechanism, of a pair of wheels in contact with the ground adapted for driving the said dropping mechanism, one of said wheels being set in advance of the other for the purposes set forth.

2. In a corn-planter, the planter-frame, a vertically-adjustable wheel journaled on said frame for driving the seeding mechanism, a similarly-adjustable wheel also journaled on the frame forward of the first wheel, said wheel also for driving the said seeding mechanism for the purposes described.

3. A corn-planter of the character described, comprising the frame thereof, a rimless wheel journaled on the said frame and adjustable vertically, a similar wheel also journaled on the frame and capable of vertical adjustment said wheel being located forward of the first wheel, both said wheels having operative connection with the seed-dropping mechanism and adjustable independently but both being raised from the ground together for stopping the planting of the seed as set forth.

4. In a corn-planter a wheel for driving the seeding mechanism consisting of a central hub $a$ having the concentric flanges $b$ and $c$, substantially as shown, spokes extending through the flanges of said hub, a stop $e$ on each spoke within the outer flange $b$ and a spring on each spoke between the said stop and the inner flange $c$, said springs adapted to permit the spokes to have free movement in one direction in a yielding manner by engaging with the ground and also adapted to return the spokes to their proper positions after movement as and for the purposes set forth.

5. In a corn-planter, the planter-frame, two wheels journaled on the said frame and capable of vertical adjustment for the purposes set forth and described, one of said wheels being located forward of the other, seeding devices for dropping the corn, and means between the said seeding devices and the said wheels for transmitting motion from the latter to the former as set forth.

6. In a corn-planter, the frame thereof, a pair of rimless wheels journaled on said frame and capable of vertical adjustment for the purposes indicated, one of said wheels being located ahead of the other for the purposes described, a rock-shaft for operating the seeding devices, a rotatable shaft adjacent to such rock-shaft and receiving motion from both said wheels, and means between the two shafts for operating one from the other substantially as set forth.

7. In a corn-planter, the planter-frame, the usual carrying-wheels therefor, a pair of rimless wheels journaled on the frame and adjustable vertically for the purposes set forth, said wheels being placed one ahead of the other substantially as shown, seeding mechanism within the seedboxes, a rock-shaft for operating such mechanism, a rotary shaft adjacent to such rock-shaft and receiving its rotary motion from the said rimless wheels, a lug on each shaft for engaging one another to operate the seeding devices at each revolution of the rotary shaft as set forth.

8. In a corn-planter, the combination with the planter-frame and its carrying-wheels, of a pair of rimless wheels journaled on said frame and capable of vertical adjustment for the purposes set forth, said wheels being arranged one in front of the other substantially as shown, the seedboxes, the runner-shanks, seeding mechanism within said boxes and shanks, a rock-shaft for operating said mechanism, a rotatable shaft adjacent to such rock-shaft and receiving motion from the said rimless wheels, and means on each shaft for engaging with each other in the revolution of the rotary shaft for operating said seeding mechanism substantially in the manner set forth.

9. In a corn-planter, the combination with the planter-frame and its carrying-wheels, of a pair of rimless wheels journaled on said frame and capable of vertical adjustment for the purposes set forth, said wheels being arranged one in front of the other substantially as shown, the seedboxes, the runner-shanks, seeding mechanism within said boxes and shanks, a rock-shaft for operating said mechanism, a rotatable shaft adjacent to such rock-shaft and receiving motion from the rimless wheels, means on each shaft for engaging with each other in the revolution of the rotary shaft for operating said seeding mechanism and a lever mechanism for raising the rimless wheels from the ground to stop the operation of planting.

10. In a corn-planter the usual frame and carrying-wheels and the seedboxes, a rock-shaft between the seedboxes for operating the seed-dropping mechanism within the boxes, a revoluble shaft adjacent to the rock-shaft and driven from means in engagement with the ground and adapted to rock the said rock-shaft at each revolution, a dial affixed to the planter-frame, the said revoluble shaft being opposite its center, and a pointer on the shaft all arranged substantially as shown and for the purposes set forth.

11. In a corn-planter, the combination of the jointed wheel-frame A, the wheel J carried by the front frame portion and adapted to be raised and lowered, means for raising and lowering it, the wheel I carried by the rear frame portion also adapted for vertical movement, means for operating it vertically, the seedboxes C on the frame A, the rock-shaft S² between and entering the boxes for operating the seed-dropping mechanism, the revoluble shaft S adjacent to the rock-shaft, said shaft S being driven from the wheels I and J substantially as shown, a lug S' on the rock-shaft and a lug s on the shaft S, the latter lug adapted to engage the former to rock the said shaft S² at each turn of the shaft S, a dial 11 on the planter-frame and a pointer carried by the said shaft S for the dial all arranged as shown.

In testimony whereof we affix our signatures in presence of two witnesses.

JAMES W. GENTRY.
ARTHUR H. STROEMER.

Witnesses:
L. M. THURLOW,
A. KEITHLEY.